United States Patent [19]
Crawford

[11] 3,981,375
[45] Sept. 21, 1976

[54] VEHICLE HOOD ASSEMBLY
[75] Inventor: John T. Crawford, Lyndhurst, Ohio
[73] Assignee: Towmotor Corporation, Mentor, Ohio
[22] Filed: Nov. 3, 1975
[21] Appl. No.: 628,683

[52] U.S. Cl............................................. 180/69 C
[51] Int. Cl.² ........................................ B62D 25/10
[58] Field of Search............. 180/69 C, 69 R, 54 A, 180/54 E; 296/76; 16/128.1

[56] References Cited
UNITED STATES PATENTS

| | | | |
|---|---|---|---|
| 2,931,452 | 5/1960 | Mackie | 180/69 C |
| 3,168,344 | 2/1965 | Barenyi | 180/69 R X |
| 3,330,593 | 7/1967 | Pollak | 296/76 |
| 3,628,622 | 12/1971 | Kiwitz | 180/69 C |
| 3,883,126 | 5/1975 | Nicholls | 296/76 X |

FOREIGN PATENTS OR APPLICATIONS

| | | | |
|---|---|---|---|
| 962,424 | 12/1949 | France | 180/69 R |
| 354,424 | 8/1931 | United Kingdom | 180/69 R |
| 870,251 | 6/1961 | United Kingdom | 180/69 C |

Primary Examiner—M. H. Wood, Jr.
Assistant Examiner—Milton L. Smith
Attorney, Agent, or Firm—Frank L. Hart

[57] ABSTRACT

A hood of a vehicle has an aligning assembly for returning a pivotal hood to a preselected position over a portion of the vehicle.

1 Claim, 6 Drawing Figures

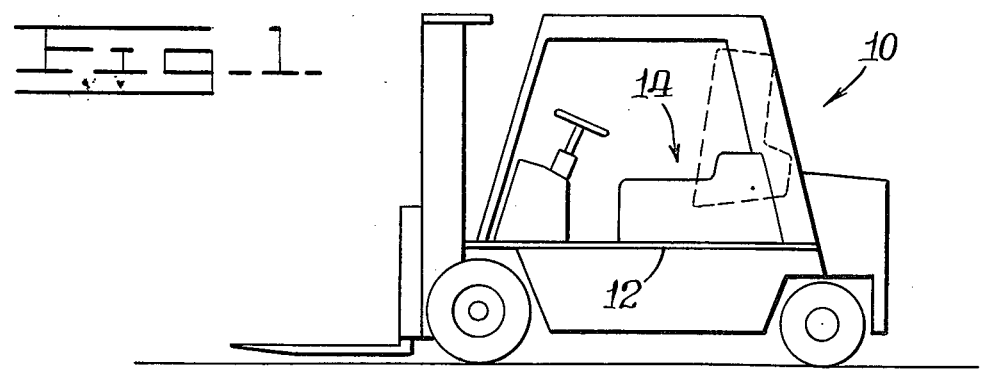
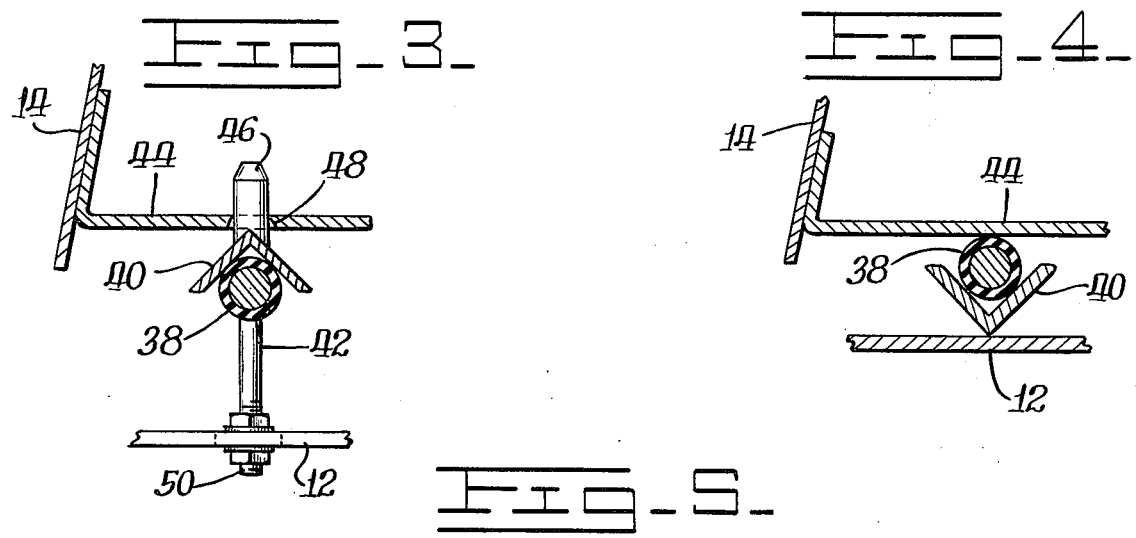
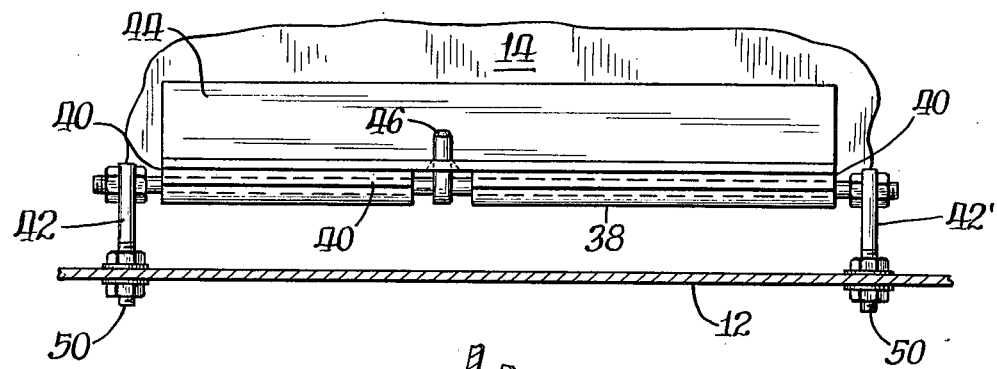
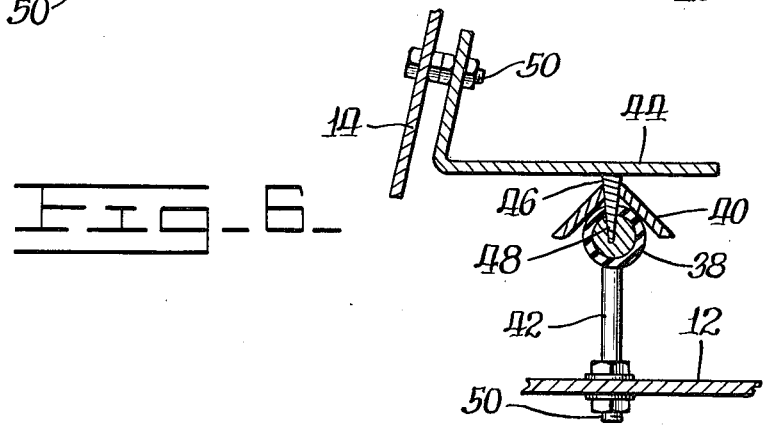

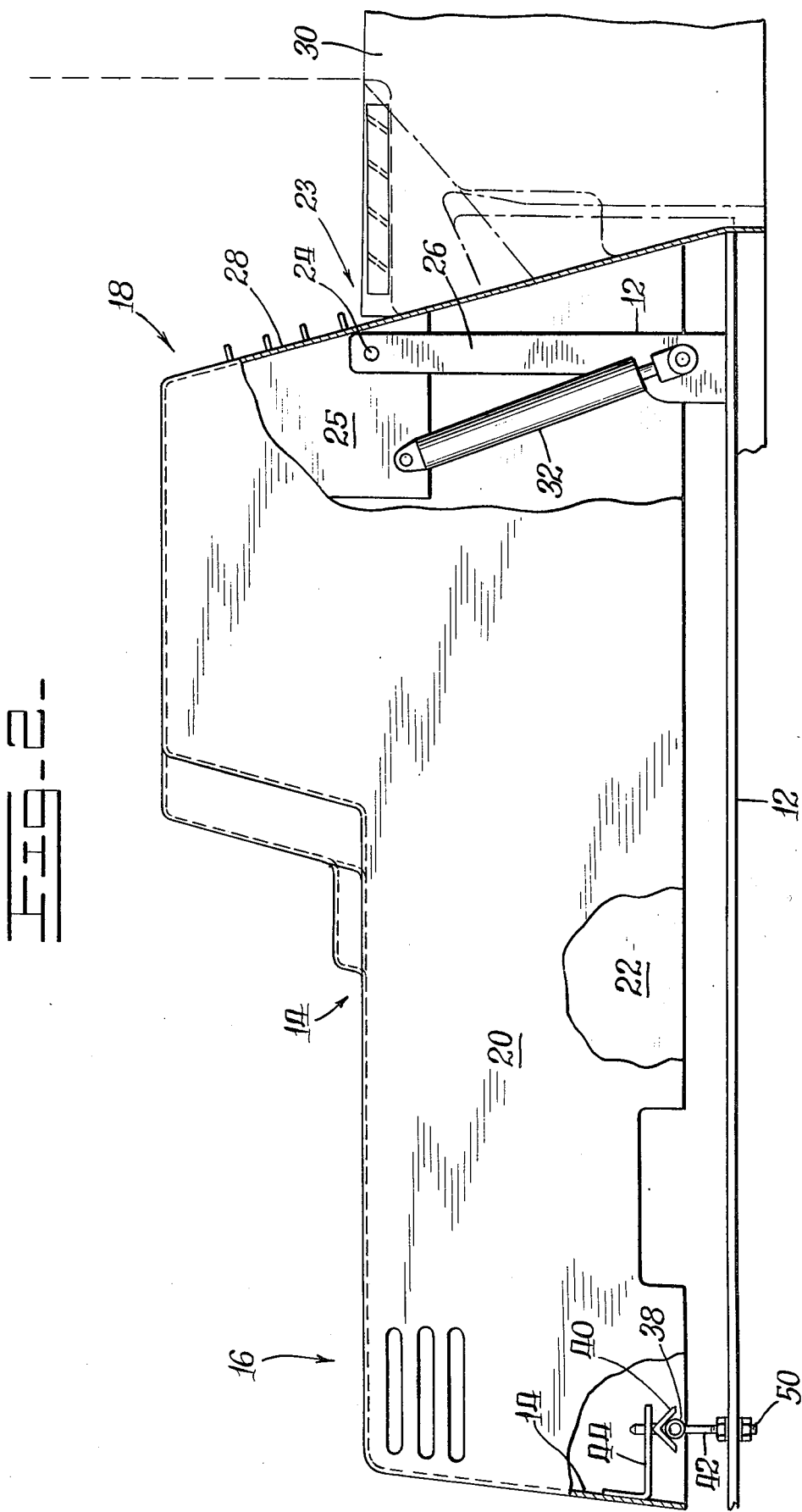

VEHICLE HOOD ASSEMBLY

BACKGROUND OF THE INVENTION

In heretofore utilized vehicles, such as lift trucks for example, panels of the hood were separately removable for gaining access to the engine or motor of the lift truck. After repeated use of the lift truck, the removable panel portions sometimes became warped or bent and would not fit properly. These misaligned hood panels would then have to be replaced or reshaped. Where, however, the panels were only slightly out of alignment, the panels would undesirably rattle during use of the lift truck.

This invention is therefore directed to a pivotal hood body of a vehicle that has an aligning assembly for assuring correct positioning of the hood body relative to the frame of the vehicle.

BRIEF DESCRIPTION OF THE DRAWINGS

FIG. 1 is a diagrammatic view of a lift truck having the hood of this invention;

FIG. 2 is a diagrammatic view with portions removed of the hood assembly of this invention;

FIG. 3 is a diagrammatic side view of the preferred stop element and aligning element;

FIG. 4 is a diagrammatic side view of another embodiment of the stop element and aligning element;

FIG. 5 is a diagrammatic frontal view of the preferred stop element, aligning element, and centering assembly; and FIG. 6 is a diagrammatic side view of another embodiment of the centering assembly.

DETAILED DESCRIPTION OF THE INVENTION

Referring to FIG. 1, a vehicle, such as a lift truck 10 has a frame generally referred to by numeral 12 and a unitary hood body 14 that is pivotally connected to the truck 10 for movement between a first position, shown by solid lines, and a second position shown by broken lines. At the first position, the hood body 14 is overlying a preselected portion of the lift truck 10. At the second position, the hood body 14 extends outwardly from the lift truck 10 and is spaced from the preselected portion for providing access to an engine or motor (not shown) mounted on the truck 10. At the first position of the hood body 14, the engine or motor is covered by the hood body 14. It should be understood, however, that other equipment of the lift truck 10 can be covered by the hood body 14 of this invention.

Referring to FIG. 2, the hood body 14 has first and second end portions 16, 18, and first and second side portions 20, 22.

Means 23 such as a pivot pin 24 is connected by plate 25 to the hood body 14 and passes through a portion 26 of the frame 12 for pivotally connecting the hood body 14 to the lift truck 10. The hood body 14 pivots about pin 24 during movement between its first and second positions. The pivot pin 24 is positioned at and extends across the second end portion 18 of the hood body 14 at about a median location on the height of the hood body or higher. By so positioning the pin 24 at this elevated height, the hood body 14 at the second position is positioned above counterweights 30 of the lift truck for providing greater and easier access to said engine.

Biasing means 32 is connected to the hood body 14 and the frame 12 for urging the hood body toward the second position and thereby reducing the weight that must be lifted by an operator in moving the hood body 14 to the second position. The biasing means 32 preferably is a gas spring as is known in the art. The biasing means 32 also functions to maintain the hood body 14 at the second position.

An elongated stop element 38 is connected to either the hood body 14 or frame 12 with a cooperating elongated aligning element 40 connected to the other of said body 14 or frame 12. The stop element 38 and aligning element 40 are located at the first end portion 16 of the hood body 14 and each extends across at least a portion of the hood body 14 in the first position of said hood body 14.

The aligning element 40 is positioned at a location and is of a construction sufficient for contacting the stop element 38 in the first position of the hood body 14 and urging the hood body 14 to a preselected location at the first position of the hood body 14.

FIGS. 3 and 5 show the stop element 38 connected by end brackets 42, 42' to the frame 12 with the aligning element 40 connected by bracket 44 to the first end of the hood body 14. FIG. 4 shows the stop element 38 connected to the first end of the hood body 14 with the aligning element 40 connected to the frame 12.

Referring to FIGS. 3 and 6, a centering element 46 extends outwardly from one of the hood body 14 or truck frame 12 and into an opening 48, associated with the other of said hood body 14 or frame 12. The opening 48 is of a size and at a location sufficient for receiving the centering element 46 at the first position of the hood body 14.

In the preferred embodiment of FIGS. 3 and 5, the centering element 46 is connected to the stop element 38 and the opening 48 extends through the bracket 44 of the hood body 14.

The centering assembly can however be constructed, as in FIG. 6, with the centering element 46 extending from the aligning element 40 or a bracket 44 of the aligning element into an opening 48 of the stop element 38 at the first position of the hood body 14.

It is preferred that the opening 48 and/or centering element 46 be of tapered configuration for guiding the centering element 46 into the opening 48 and further aligning the hood 14 relative to the frame 12.

Referring to FIGS. 3, 5, and 6, brackets 42, 42', and 44 can be connected to the associated frame 12 or hood body 14 by adjustable bolts 50 which provide for controlled positioning of the stop element 38 and aligning element 40 relative to the truck frame 12. These bolts 50 preferably pass through slots or oversized openings for additionally providing lateral adjustment of the stop element 38 and aligning element 40 relative to their respective supporting structure. As can be seen by a study of the drawings, the nutted bolts 50 and associated openings provide for controlled movement in any direction of the stop element 38 or aligning element 40.

In the preferred embodiment of FIGS. 3 and 5, the hood body is formed of a fiberglass matrix and therefore the supporting bracket 44 is preferably fixedly connected to the hood body 14 by, for example, glass bedding the bracket 44 to the hood body 14. Further, the aligning element 40 is of a general "V" transverse cross-sectional configuration with the open end positioned for receiving the stop element 38 at the first position of the hood body 14. The stop element 38 is preferably formed with an outer surface being of a pliable material such as rubber or organic plastic to reduce the noise resulting from closing the hood and reducing the noise resulting from any misalignment.

By so constructing the hood assembly of this invention, the stop and aligning elements 38, 40 compensate for any misalignment of the hood 14 relative to the frame 12 as the hood 14 is moved to the first position. The centering element further assures that the hood is maintained at a preselected location at the first position. The connecting means of the stop element 38 and/or the aligning element 40 provide means for controllably aligning the hood 14 at a preselected first position.

Other aspects, objects and advantages of this invention can be obtained from a study of the disclosure and appended claims.

What is claimed is:

1. A hood assembly of a vehicle having a frame, comprising:
   a hood body having first and second end portions and being of a construction sufficient for covering a preselected portion of the vehicle;
   means adjacent the second end portion for pivoting the hood body between a first position overlying the preselected portion of the vehicle and a second position at which portions of the hood body are positioned laterally from said preselected vehicle portion and the hood extends generally vertically from the vehicle, said pivot means being of a construction for pivoting the hood at about a single median location of the height of the hood body;
   a plate connected to the second portion of the hood body adjacent the pivot means and extending toward the first end portion of the hood;
   a gas spring having one end connected to the vehicle frame and the other end connected to the plate at a location spaced from the pivot means a preselected direction toward the first end portion of the hood;
   an elongated stop element controllably, movably connected at opposite ends to the frame at a location adjacent and extending across at least a portion of the first end portion of the hood body in the first position of said hood body, said stop element having at least portions covered with a pliable material;
   a centering element connected to the stop element and extending substantially vertically upwardly therefrom;
   a supporting bracket connected to the first end portion of the hood and extending from said hood first end portion toward the second end portion of the hood; and
   an elongated aligning element having a generally inverted "V" cross-sectional configuration and a tapered opening extending therethrough and being controllably, movably connected to the supporting bracket for receiving the centering element and contacting the stop element at the first position of the hood, said elongated aligning element being controllably positionable on the supporting bracket and said stop element being controllably positionable on the frame and said stop and aligning elements being of a construction sufficient for urging the hood toward a preselected position in response to passing the centering element into the opening and contacting the stop element with the aligning element during movement of the hood from the first to the second position.

* * * * *